(12) United States Patent
Marks et al.

(10) Patent No.: US 9,606,968 B2
(45) Date of Patent: Mar. 28, 2017

(54) FOOTNOTE FORMATTING AND LAYOUT OF MULTI-SECTION DOCUMENTS

(71) Applicant: WORKIVA INC., Ames, IA (US)

(72) Inventors: Joel Marks, W. Des Moines, IA (US); Edward Cupps, Nevada, IA (US); Bretton Finch, Ankeny, IA (US); Keaton Carter, Ames, IA (US); Winston Chappell, Ames, IA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/698,055

(22) Filed: Apr. 28, 2015

(65) Prior Publication Data

US 2016/0321215 A1 Nov. 3, 2016

(51) Int. Cl.
G06F 17/00 (2006.01)
G06F 17/21 (2006.01)
G06F 17/24 (2006.01)
G06F 3/0484 (2013.01)

(52) U.S. Cl.
CPC .......... *G06F 17/212* (2013.01); *G06F 3/0484* (2013.01); *G06F 17/211* (2013.01); *G06F 17/217* (2013.01); *G06F 17/241* (2013.01)

(58) Field of Classification Search
CPC .. G06F 17/241; G06F 17/24; G06F 17/30011; G06F 21/6227; G06F 17/217;
(Continued)

(56) References Cited

U.S. PATENT DOCUMENTS 4,503,515 A 3/1985 Cuan et al.
4,648,071 A * 3/1987 Repass .................. G06F 17/241
715/205

(Continued)

FOREIGN PATENT DOCUMENTS

EP 0 094 516 B1 7/1990

OTHER PUBLICATIONS

Illinois Valley Community College Writing Center, "Creating Footnotes In Chicago Style," <https://www.ivcc.edu/stylebooks/stylebook5.aspx?id=14646>, 2014, 2 pages.
(Continued)

*Primary Examiner* — Scott Baderman
*Assistant Examiner* — Jason Edwards
(74) *Attorney, Agent, or Firm* — Drinker Biddle & Reath LLP

(57) ABSTRACT

A computer implemented system provides intelligent formatting of footnotes in electronic documents. The system includes a display device that displays an electronic document in a graphical user interface, a user interface, and a processor. The processor controls the display device and the user interface to display, in response to user input, a footnote editing interface that allows a user to create new footnotes and edit existing footnotes. The system provides multi-user access to a single document in which individual sections of the document may be in active, inactive, and/or locked states, where users perform activities as permitted by a combination of user authorization rights and these states. The footnotes may reference multiple sections on one or more pages of a document, are formatted so that each footnote resides on only a single page, and may display an obscured or blank area for footnotes originating in other sections.

17 Claims, 12 Drawing Sheets

(51) Int. Cl.
(58) Field of Classification Search
CPC .... G06F 17/212; G06F 17/211; G06F 3/0484; G06Q 10/10
USPC .......................................................... 715/232
See application file for complete search history.

(56) References Cited

U.S. PATENT DOCUMENTS

| | | | |
|---|---|---|---|
| 5,440,678 | A | 8/1995 | Eisen et al. |
| 6,529,905 | B1 * | 3/2003 | Bray ........................ G06F 9/526 |
| 6,971,062 | B1 | 11/2005 | Tolpin |
| 8,700,986 | B1 | 4/2014 | Pereira et al. |
| 2006/0156225 | A1 * | 7/2006 | Burago ................. G06F 17/217 |
| | | | 715/251 |
| 2008/0028300 | A1 * | 1/2008 | Krieger ................. G06Q 10/10 |
| | | | 715/255 |
| 2010/0121888 | A1 | 5/2010 | Cutting et al. |
| 2012/0101980 | A1 * | 4/2012 | Taleghani ........... G06F 17/2288 |
| | | | 707/608 |
| 2013/0191732 | A1 | 7/2013 | Lazarevic et al. |
| 2013/0339847 | A1 * | 12/2013 | Bartek .................... G06F 17/24 |
| | | | 715/255 |
| 2014/0208192 | A1 | 7/2014 | Zaric et al. |

OTHER PUBLICATIONS

Russell et al., "Welcome to the Purdue OWL," <https://owl.english.purdue.edu/owl/owlprint/747/>, 2014, 51 pages.
Wyatt, "Using Multiple References to the Same Footnote," <http://word.tips.net/T000070__Using_Mutiple_References_to_the_Same_Footnote.html>, 2012, 4 pages.

* cited by examiner

FIG. 5

FOOTNOTE FORMATTING AND LAYOUT OF MULTI-SECTION DOCUMENTS

BACKGROUND

Field

Disclosed embodiments generally relate to document processing software and intelligent formatting of documents.

Related Art

Electronic document editing software systems have reached a state of maturity in which such systems are commonly used in business and by the average individual for personal use. These systems generally provide users the ability to create and edit electronic documents having numerical and textual data through user interaction with a graphical user interface. Some of these systems also provide for the creation, editing, and formatting of footnotes.

SUMMARY

The disclosed embodiments provide systems, methods, and computer program products that provide improved functionality and formatting of electronic documents including multi-section documents having footnotes.

In an embodiment, a computer implemented system is disclosed that provides intelligent formatting of footnotes in electronic documents. The system includes a display device that displays an electronic document in a graphical user interface, a user interface that receives numerical and textual input, and a processor. The processor controls the display device and the user interface to display, in response to user input, a footnote editing interface that allows a user to create new footnotes and edit existing footnotes based on user interactions with the footnote editing interface. The footnotes may reference multiple sections on one or more pages of a document and are formatted so that each footnote resides on only a single page. The system provides multi-user access to a single document in which individual sections of the document may be active, inactive, and/or locked; each state is described in detail below with reference to the accompanying drawings.

In a further embodiment, a computer implemented method is disclosed. The method includes displaying, by a computational device, a graphical user interface on a display device, wherein the graphical user interface allows a user to create new documents and to edit existing documents based on user interactions with the graphical user interface. The method further includes displaying, in response to user input, a footnote editing interface within the graphical user interface that allows a user to create new footnotes and edit existing footnotes based on user interactions with the footnote editing interface. In an embodiment, footnotes may be referenced from multiple sections on one or more pages of a document and are formatted so that each footnote resides on only a single page. In a further embodiment, the method provides multi-user access to a single document in which individual sections of the document may be active, inactive, and/or locked; each state is described in detail below with reference to the accompanying drawings.

In a further embodiment, a non-transitory computer readable storage device having computer program instructions stored thereon is disclosed. The computer program instructions are such that when executed by a processor, they cause the processor to perform the above-described method.

Further features and advantages of the invention, as well as the structure and operation of various embodiments of the invention, are described in detail below with reference to the accompanying drawings. The invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate embodiments of the invention and, together with the description, further serve to explain the principles of the invention and to enable a person skilled in the relevant art(s) to make and use the invention.

FIG. 5 is a screen shot illustrating how the GUI may be used to place footnotes in tables, according to an embodiment.

Figure 1:
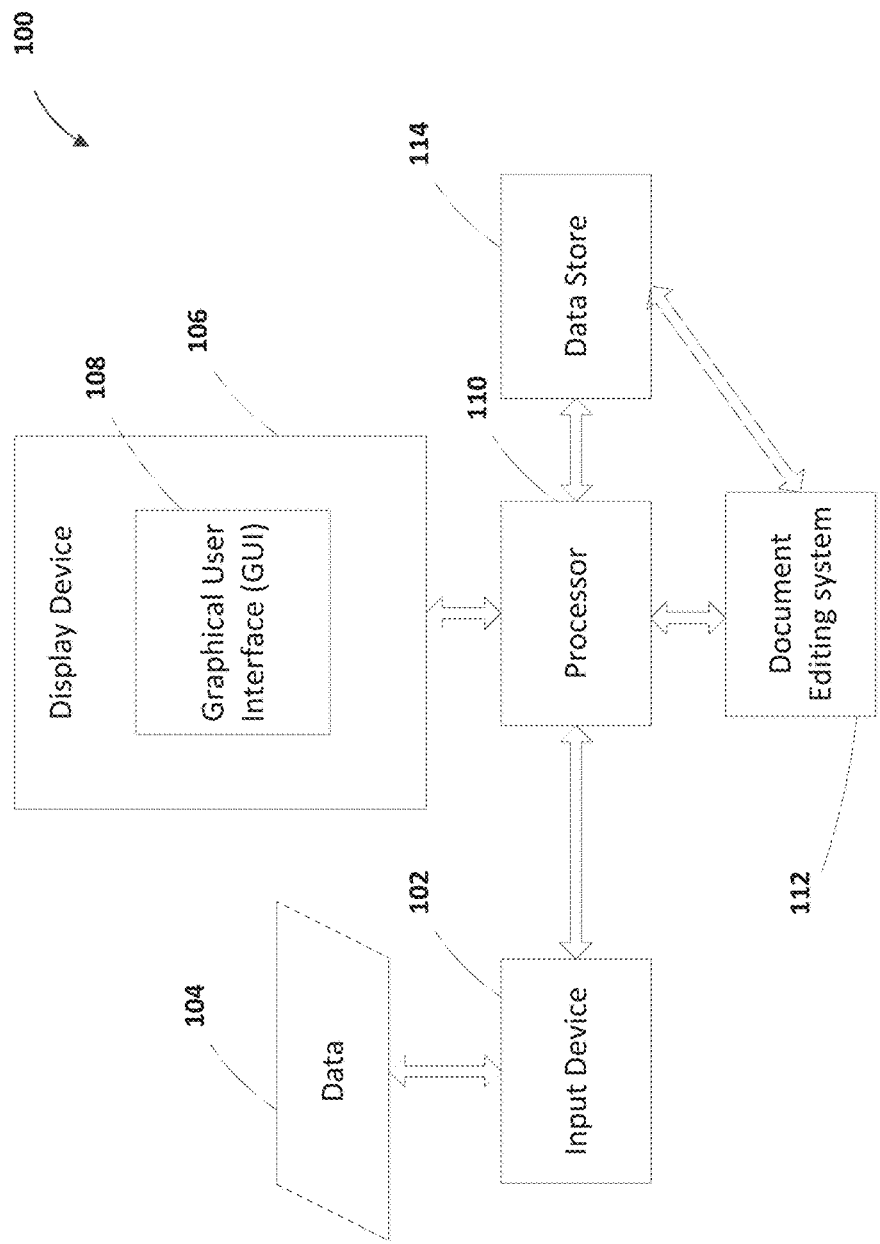
FIG. 1 is a schematic block diagram of a computer implemented system that provides intelligent formatting of footnotes in electronic documents, according to an embodiment.

The features and advantages of various embodiments of the invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

Any additional disclosure found in the figures is meant to be exemplary and not limiting to any of the features shown in the figures and described in the specification below.

DETAILED DESCRIPTION

This specification discloses one or more embodiments that incorporate the features of this invention. The disclosed embodiment(s) merely exemplify the invention. The scope of the invention is not limited to the disclosed embodiment(s).

The embodiment(s) described, and references in the specification to "one embodiment," "an embodiment," "an example embodiment," etc., indicate that the embodiment(s) described may include a particular feature, structure, or characteristic, but not every embodiment necessarily includes the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Disclosed embodiments provide a document processing software system in which footnotes in a text document are intelligently formatted. The system provides multi-user access to a single document in which individual sections of the document may be active ("active"), inactive ("inactive"), and/or locked ("locked"). The current document section as selected by the user (e.g., through a user interface) or by the system (e.g., when a user reopens a document the system may automatically activate the section last edited by that user) is the active section; all other document sections are inactive. A user may be able to activate multiple sections of a document according to an embodiment. A document section may be locked so that only the user editing the section has editing and/or write access to the section; other users may still be able to perform other activities (e.g., view or comment) within those locked sections as permitted by their authorization rights). In a further embodiment, an inactive section may appear to other users as a blank, obscured, or viewable but non-editable area ("blank area"). Sections may be as small as one or a few words, or as large as to include multiple paragraphs spanning multiple pages.

Footnotes may be easily incorporated in a section using an intuitive interface driven by a few mouse clicks, for example. A user may create a footnote by placing the cursor at the position in the document where the desired footnote reference number or reference character is to be placed. By invoking a menu command, a footnote interface is opened and the user may simply type the footnote text as desired.

Multiple sections may appear on a given page of the document and the footnote formatter correctly determines the required area needed for the footnote section. In an embodiment, the placement of sections on the page interacts with the formatting of the footnote area so that footnotes are not split across pages. Footnotes and the placement of footnotes and sections on a page are automatically updated as the document is edited. Footnotes in table entries are also properly formatted and updated automatically as the document is edited.

In another embodiment footnotes in table entries, under instruction from the user and for each table independently, may be directed to a footnote area immediately below the respective table. The reference numbers would be numbered in their own consecutive sequence independent of those used in the document's footnote area and optionally could be numbered in a format different from that of the document's footnotes e.g., letters of the alphabet "a", "b", "c", etc. or Roman numbers "i", "ii", "iii", etc.

When a section is inactive and has footnotes belonging to a visible footnote area on the page, a corresponding blank area appears in the footnote area to account for footnotes from the inactive section. When separate documents having footnotes are combined, the formatting of footnotes in the combined document is intelligently updated in terms of layout and numbering. A given footnote may be referenced in multiple places in the document and appears correctly numbered. When a given sentence or table entry references multiple footnotes, the reference numbers appear in the document intelligently formatted, for example, with commas separating reference numbers. As footnotes are added or deleted the placement of reference numbers, including commas, is correctly updated with commas being added or deleted as needed.

FIG. 1 is a schematic illustration of a computer implemented system 100 that provides intelligent formatting of footnotes in electronic documents, according to an embodiment. The system includes an input device 102 that receives data 104 from user interactions with the input device. The system also includes a display device 106 that provides visual feedback to a user. The display device 106 may display part of a graphical user interface (GUI) 108. The GUI 108 provides a graphical editing environment in which a document may be displayed as it is being modified in response to data 104 received through user interactions with the input device 102.

According to an embodiment, a processor 110 controls the input device 102 and the display device 106. The processor 110 may also interact with a document editing system 112 and a data store 114. The processor 110 controls the input device 102, the display device 106, the document editing system 112, and the data store 114, to provide real-time document editing capabilities.

Using this embodiment of the system 100, a user is enabled to enter input data 104 using a standard user input device 102. The input device 102 interacts with the document editing system 112 via the processor 110. The document editing system 112 enables the user to input text and numerical data using familiar spreadsheet and word processing tools. The document editing system 112 stores the data in a source file residing on the data store 114 that may be located on a server, cloud computing environment, or stand-alone machine.

Figure 2:
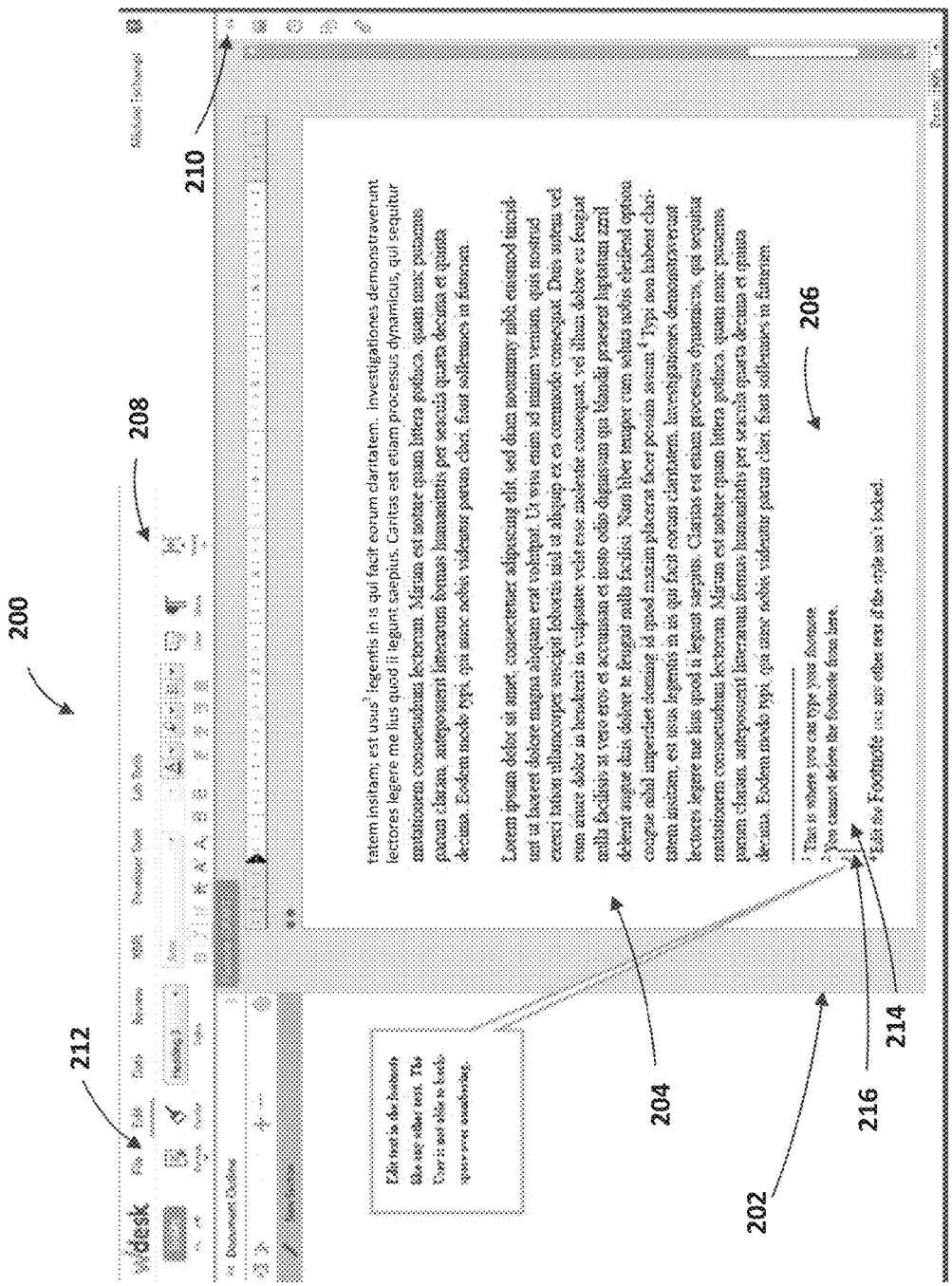
FIG. 2 is a screen shot of a graphical user interface (GUI), as part of a computer implemented system, as it might appear on a display device, according to an embodiment.

FIG. 2 is a schematic illustration of a GUI 200, as part of a computer implemented system, as it might appear on a display device 106, according to an embodiment. In this example, the GUI 200 includes an editing area 202 in which a page of a document may be displayed. The editing area 202 may be divided into a body text area 204 and a footnote area 206. The GUI may include various tool bars, 208 and 210, that provide editing functionality. By using a standard input device 102, such as a mouse, a user may select and invoke tools from one of the tool bars 208 and/or 210.

As an example, a formatting tool 212 may be invoked, according to an embodiment. A footnote editing interface may be invoked by graphically selecting a menu item (not shown) that is presented when a user invokes the formatting tool 212, as described in further detail below. Before invoking the formatting tool 212 the desired location of a new footnote reference may be indicated by placing a cursor at a desired location in the body text area 204, through user interaction with the input device 102. Once the footnote editing interface is invoked, a blank numbered area appears in the footnote area 206. In this example, the blank area is shown with a footnote reference number "3".

As shown in this example, a cursor 216 appears in the blank area 214. A user is then able to type text into the footnote area 214 to generate the footnote numbered "3". In generating the footnote, the user may type normally using standard editing functionality. For example, characters may be typed using a standard keyboard and easily deleted using the backspace/delete key of a standard keyboard. In this embodiment, however, a user cannot backspace over the footnote number. Footnotes may be deleted using other functionality of the footnote editing interface, as described in further detail below.

Figure 3:
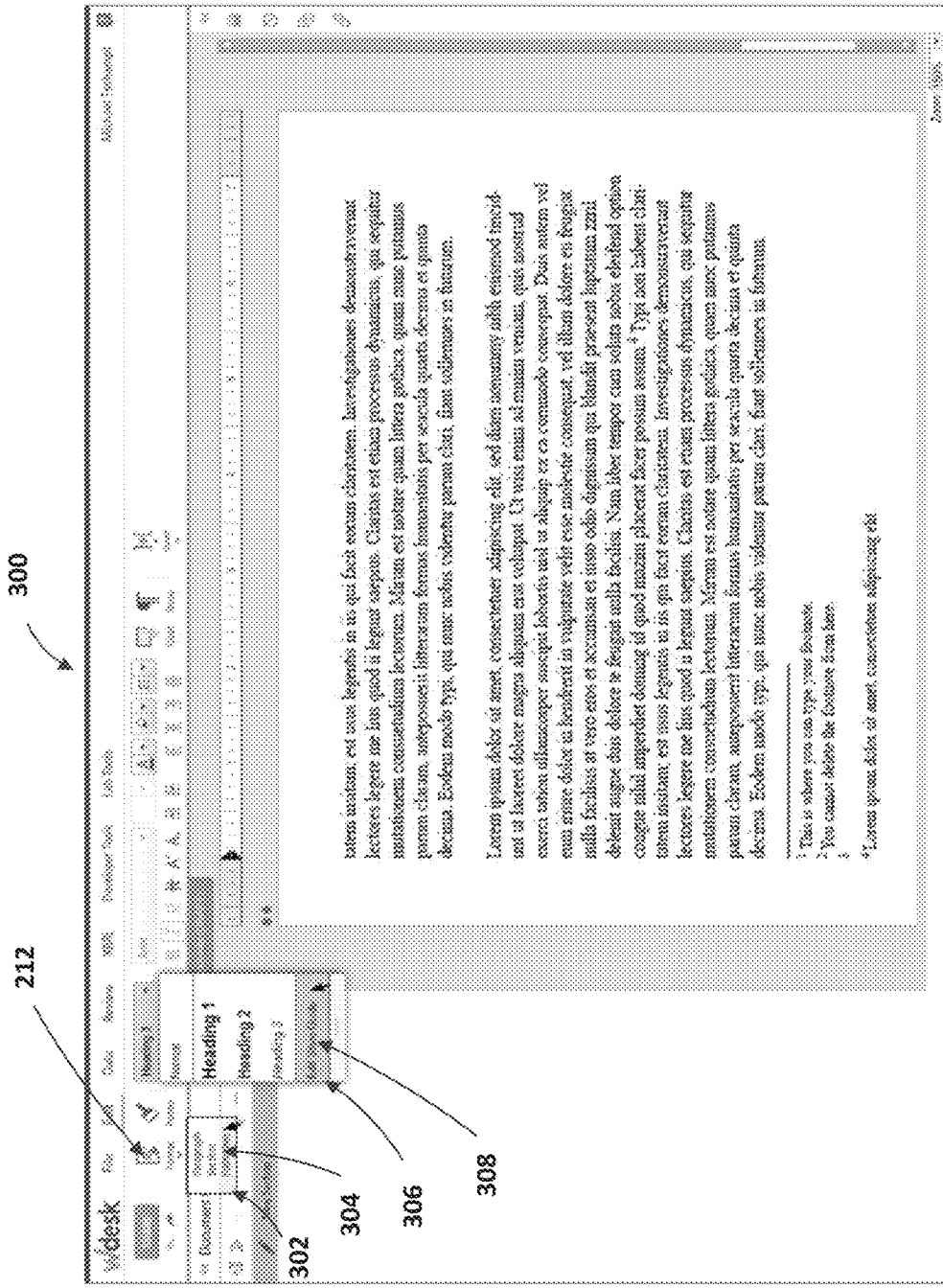
FIG. 3 is a screen shot of various graphical menu items that may be selected though user interaction with the GUI, according to an embodiment.

FIG. 3 is a schematic illustration 300 of various graphical menu items that may be selected though user interaction with the GUI, according to an embodiment. As mentioned above, the formatting tool 212 may be invoked by graphical selection with a standard input device 102 such as a mouse. In this example, a menu 302 opens when the formatting tool 212 is selected. The menu 302 has three selectable items: "paragraph," "section," and "footnotes." Various other editing tools may be invoked by selecting one of the three menu items. In this example, the "footnotes" menu item 304 is selected.

FIG. 3 also illustrates another menu 306 that provides various formatting options. This menu 306 lists a number of selectable editing styles including "Normal," "Heading 1," "Heading 2," etc. Various formatting styles are invoked by selecting corresponding items from menu 306. In this example, menu item 308 entitled "Edit Style Guide" has been selected. The selection of menu item 308 invokes the "Edit Style Guide" editing interface as shown in FIG. 4 and discussed below.

Figure 4:
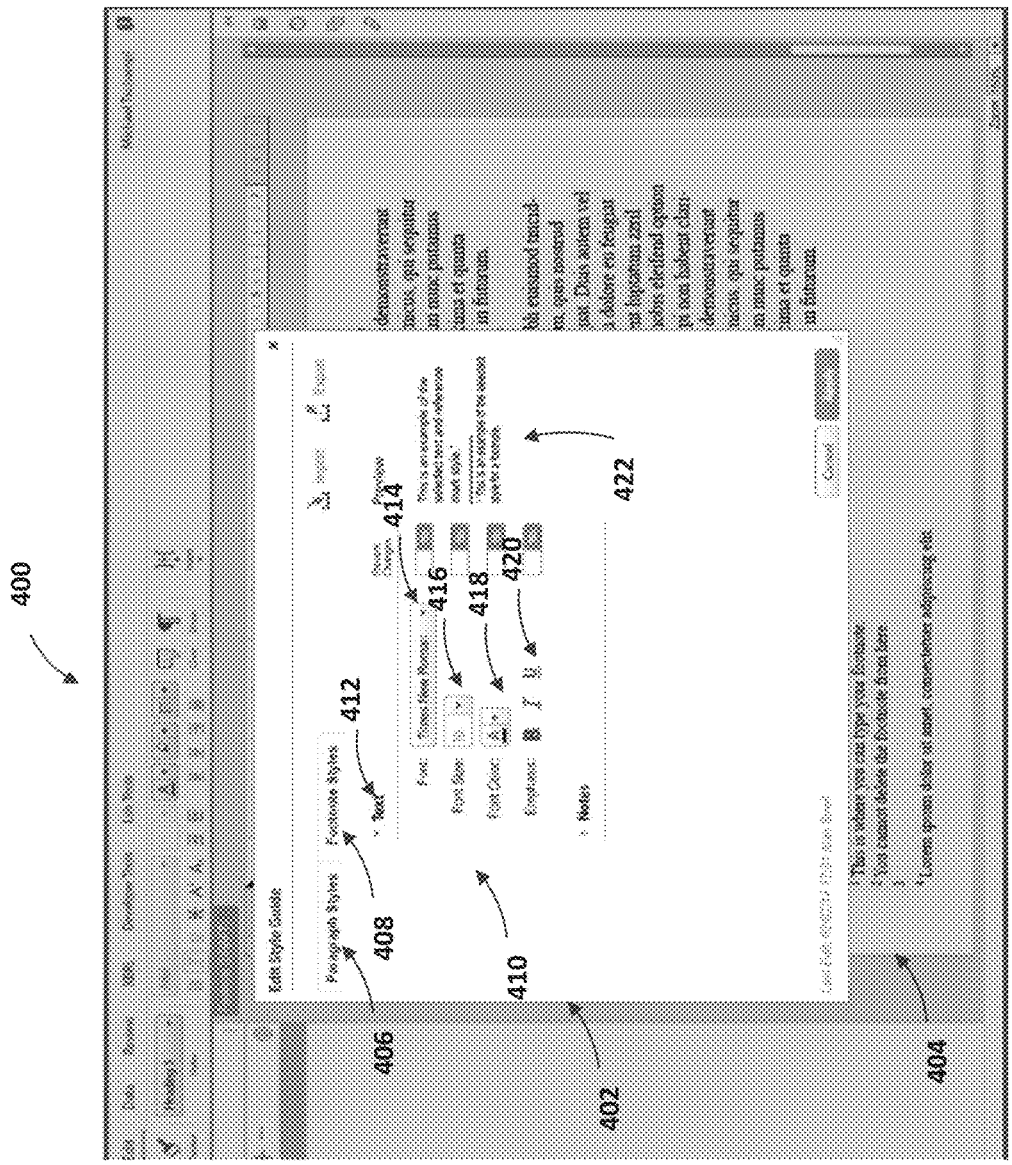
FIG. 4 is a screen shot of the GUI as it looks upon invoking the "Edit Style Guide" editing interface, according to an embodiment.

FIG. 4 is an illustration 400 of the GUI as it looks upon invoking the "Edit Style Guide" editing interface 402, according to an embodiment. The "Edit Style Guide" editing interface 402 appears as a window superimposed over the document being edited 404. The "Edit Style Guide" editing interface 402 offers editing functionality by providing a number of tools that may be graphically selected. For example, a tab 406 may be selected in order to adjust settings for the editing style to be used in paragraphs of the document being edited 404. Further, another tab 408 may be selected in order to adjust settings for the editing style to be used in the footnotes section.

FIG. 4 illustrates a drop down interface 410 that may be graphically invoked by selecting the "Text" button 412. Once the interface 410 is invoked, various settings may be adjusted that affect the formatting of text. For example, the font 414, font size 416, font color 418, and emphasis 420 variables may each be separately adjusted. In this example, the "Edit Style Guide" also provides a preview region 422 illustrating the currently selected values of the various editing parameters.

Figure 5:
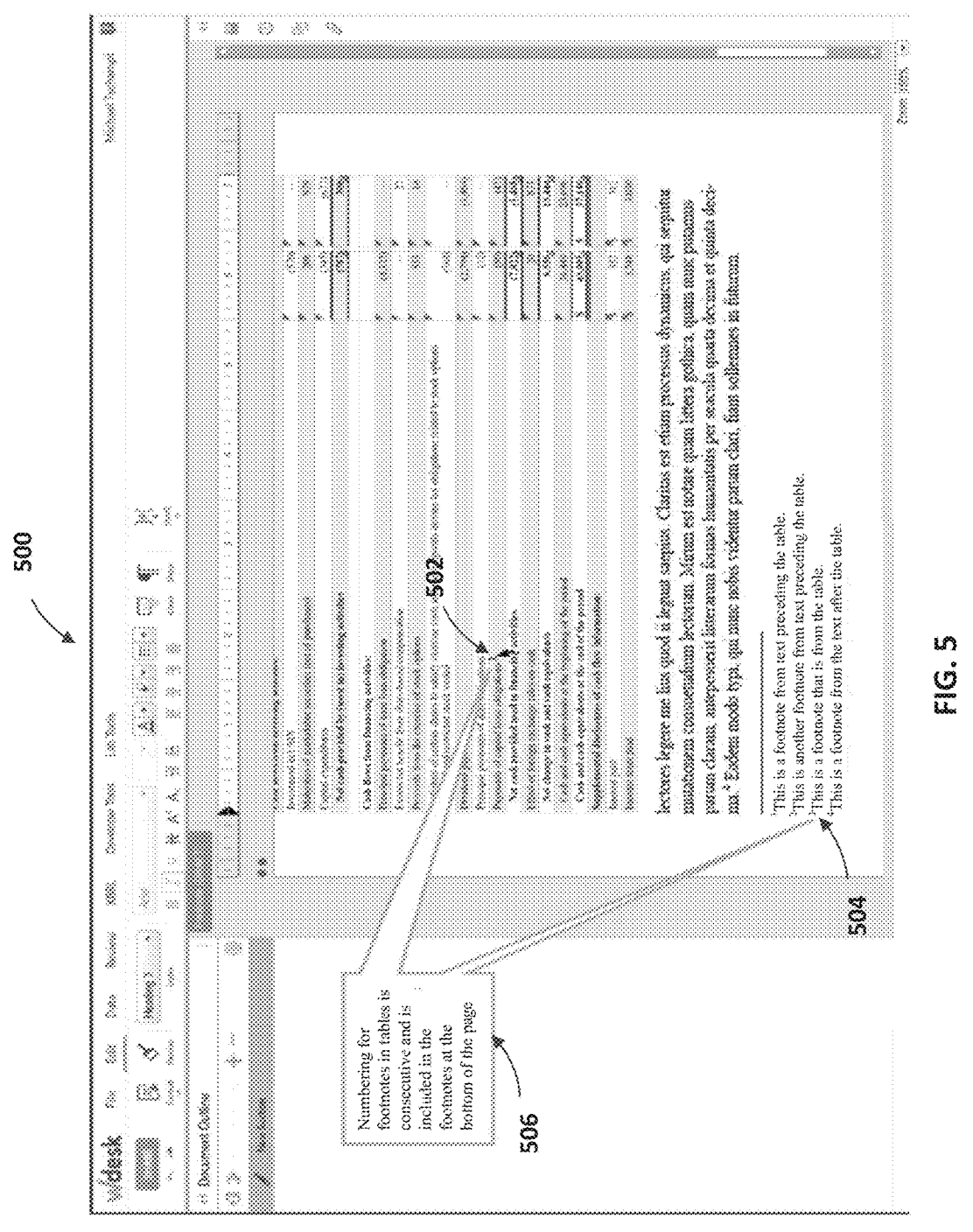

FIG. 5 is a schematic illustration 500 of how the GUI may be used to place footnotes in tables, according to an embodiment. A footnote may be associated with a table entry in an easy and straightforward manner. The procedure is similar to that used when constructing a footnote having a reference appearing in a paragraph in the body text area 204 (see FIG. 2). In an example embodiment, a user places a cursor at the desired location in the table. Then, the footnote editing interface is invoked based on user input to the input device 102. For example, a user might invoke the footnote editing interface with one or more keystrokes. In another embodiment, the footnote editing interface may be invoked by one or more mouse clicks, etc.

When the footnote editing interface is invoked, a numbered area 216 is generated in the footnote area as shown, for example, in FIG. 2. The cursor then jumps to the numbered footnote area 216. The user may then type the footnote text. The result is as shown in FIG. 5. A reference character 502 appears at the desired location in the table entry and a corresponding numbered footnote 504 appears in the footnote area. As indicated in the textbox 506, numbering in tables is continuous and preferably appears in the footnote area on the page on which the footnote is referenced.

In another embodiment, the footnote area and the body text or table display areas are determined so that footnotes are not broken over multiple pages. Similarly, if a footnote reference appears in the body text area or in a table on a given page, the footnote appears in the footnote area of the same page. This functionality represents a clear improvement over existing document editing software systems. Conventional systems may provide functionality to include footnotes in documents. Such systems, however, often split footnotes over multiple pages without providing any clear visual guide to dispel confusion when part of a footnote appears on a page other than the one containing the footnote reference. Similarly, footnote numbering is consistent between footnotes in the body text and in tables and is updated in real time as footnotes are inserted and/or deleted. Conventional systems may also fail to provide this functionality in a consistent manner.

Conventional systems also suffer from cumbersome procedures aimed at maintaining version control in multi-user situations. Some conventional systems provide a functionality in which a given document can be checked out or locked so that only a single user may edit the document at any given time. This is a serious drawback that hinders productivity when multiple users desire to edit the same document simultaneously. The disclosed embodiments solve this problem by allowing individual sections of a multi-user document to be locked. As such, multiple users can simultaneously edit a document without facing version control problems as long as each user is editing in different sections at any one time. According to an embodiment, these different sections may appear as a blank areas to users not active within them, as described below; and according to a further embodiment other users may still be able to perform other activities (e.g., view or comment) within locked sections as permitted by their authorization rights), as described above. According to a further embodiment, the simultaneous editing may be finer grain document components than that of a document section e.g., simultaneous editing within the same section but of different paragraphs, words or even characters without facing version control problems as long as each user is editing different document components at any one time.

Figure 6:
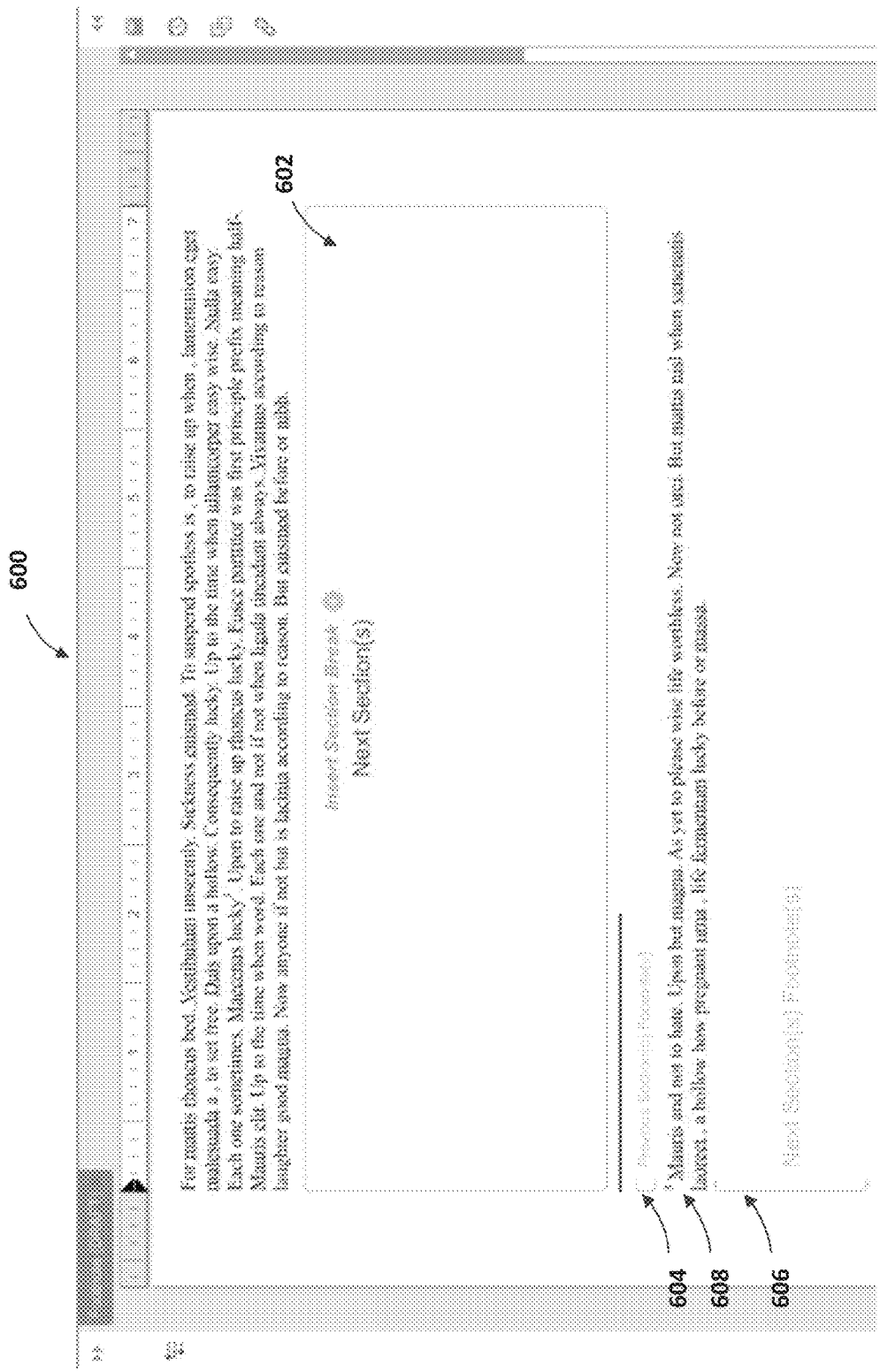
FIG. 6 is a screen shot illustrating how the GUI provides multi-user access to a document in which inactive sections appear as blank, obscured, or viewable but non-editable areas to users not active in that section, according to an embodiment.

FIG. 6 is a schematic illustration 600 of how the GUI provides multi-user access to a document in which inactive sections appear as blank areas, according to an embodiment. This example relates to a multi-user document having multiple sections that may appear on multiple pages or on a single page. The blank area 602 corresponds to an inactive section following the one being edited by the user. The footnote area contains a first blank area 604 corresponding to footnotes from a first inactive section. The footnote area also contains a second blank area 606 corresponding to footnotes from a second inactive section. In addition to the blank area 602 corresponding to a body text area of the first inactive section, and the blank areas 604 and 606 corresponding, respectively, to footnotes from the first inactive section and the second inactive section, there may be some footnotes corresponding to an active section. In this example, footnote 608 labeled "3" corresponds to a user's active section appears as it normally would.

The formatting of the body text area and the footnote area corresponding to an inactive section is properly formatted just as it would be if the section was not inactive. The formatting can reflect either the current but unsaved state, or the most recently saved or shared state of the inactive section, in an embodiment. In further embodiments, information may be provided regarding the user who has access to a given section. Such information may be provided as text (not shown) in a blank area corresponding to an inactive section.

In a further embodiment, the layout and pagination of the document and the footnote area on a user's machine may be actively updated while multiple users are editing the document. This real-time updating of formatting may occur even when there are sections that contribute to a page that the user doesn't have view access to. The system provides this functionality by storing off-line metrics that may be used to determine the layout of a page so it will have an appropriate layout whether or not a user has access to all or some of the sections.

Figure 7:
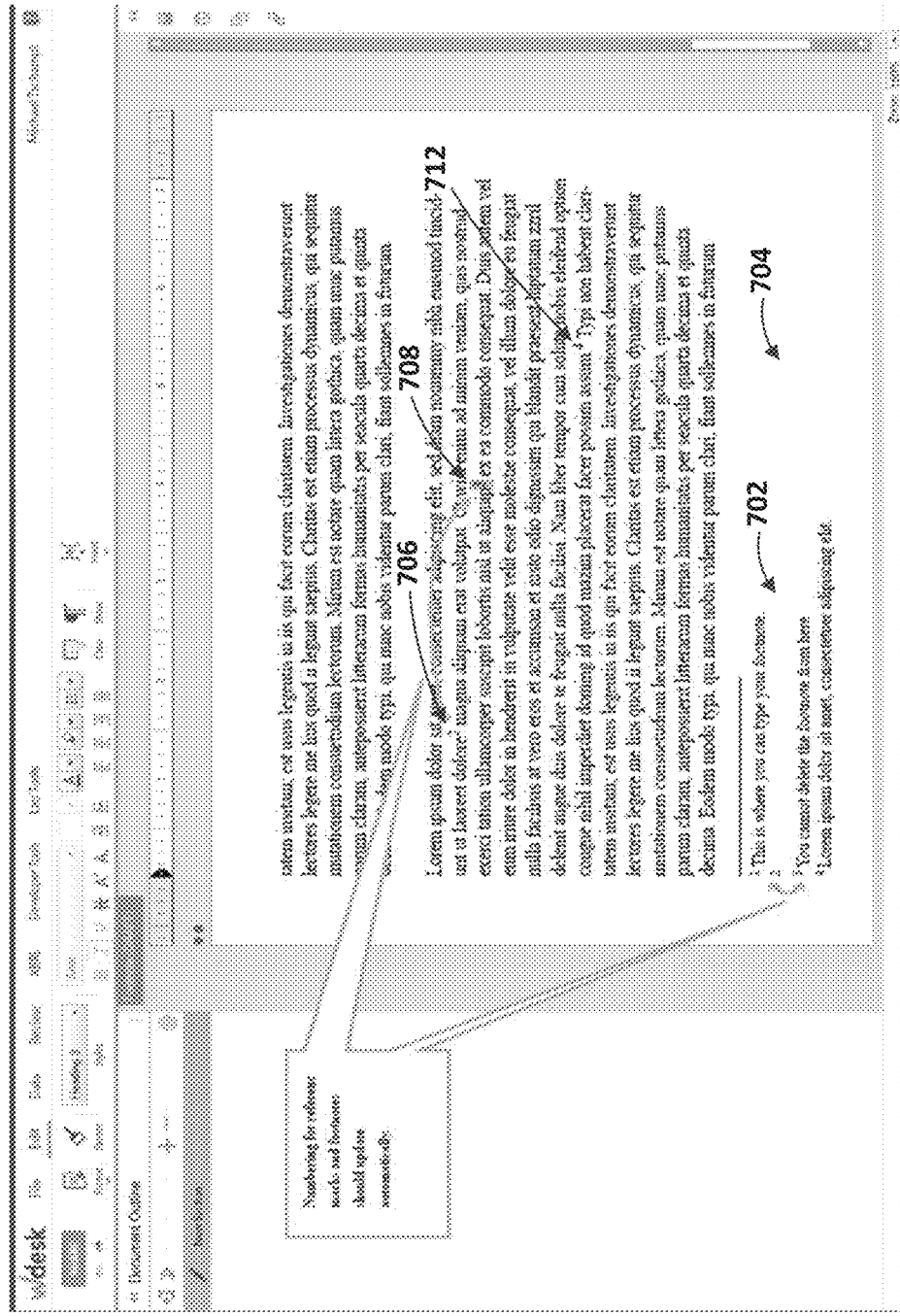
FIG. 7 is a screen shot illustrating how the GUI may be used to delete a footnote, according to an embodiment.

According to an embodiment, as illustrated in FIG. 2, footnote text may be entered in the footnote area after the footnote editing interface has been invoked. The footnote text may be modified or deleted by using standard editing tools (e.g., backspacing, selecting and deleting, adding text by typing, etc.). However, the footnote cannot be deleted by deleting the footnote text. In other words, the footnote number cannot be deleted in the footnote area by using the backspace or delete key. According to an embodiment, footnotes are deleted by selecting and deleting the footnote reference character in a body text area (i.e., in a paragraph) or table entry. This is illustrated in FIG. 7 below. In a further embodiment, when there are multiple references to a footnote the deletion happens only after the deletion of the last reference in the body text area and table entry.

FIG. 7 is a schematic illustration 700 of how the GUI may be used to delete a footnote, according to an embodiment. Suppose, for example, a user wants to delete footnote "2" 702 and attempts to do so by deleting the text of footnote "2" in the footnote area 704. By using the delete or backspace key, for example, the text of footnote "2" may be deleted to leave a blank area 702. In a further embodiment, the text of footnote "2" (not shown) may be graphically selected (e.g., by using a mouse) and deleted using a keystroke or mouse click. Though the text of footnote "2" can be deleted from within the footnote area 704, the footnote number "2", and thus its respective footnote area, cannot.

In the example of FIG. 7, suppose the user wants to delete footnote "2" 702. This is accomplished by deleting the footnote reference number "2" 706 in the text. Similarly, a few words, a sentence, or a section of text containing the footnote reference number "2" may be selected and deleted. Once footnote "2" 702 is removed in this way, all other footnotes and their reference numbers are updated to have the correct numbering. For example, when footnote reference number "2" 706 is removed from the text, existing footnote reference number "3" 708 becomes renumbered to have number "2". The space previously occupied by footnote "2" 702 in the footnote area 704 is then removed. The result of this operation is shown in FIG. 8.

Figure 8:
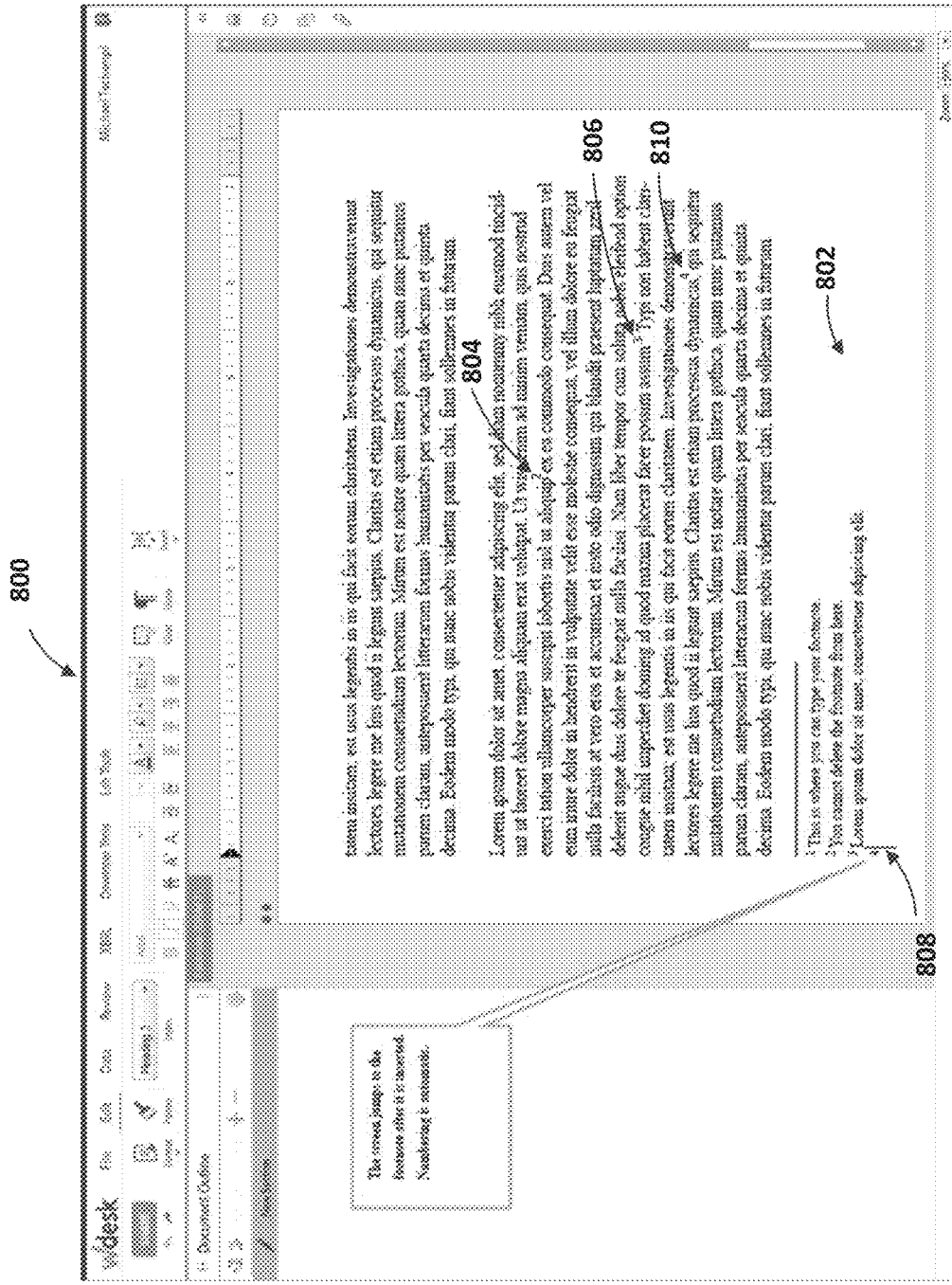
FIG. 8 is a screen shot showing automatic reordering and numbering of footnotes that occurs when one footnote is deleted, according to an embodiment.

FIG. 8 is a schematic illustration showing automatic reordering and renumbering of footnotes that occurs when one footnote is deleted, according to an embodiment. The footnote area 802 now shows the footnotes properly renumbered in sequential order. Reference number "3" 708 of FIG. 7 has now been changed to reference number "2" 804 in the text. Reference number "4" 712 of FIG. 7 has now been changed to reference number "3" 806. When a fourth footnote is inserted, a reference number "4" 810 appears in the text and the cursor 808 jumps to the footnote area allowing the user to type in the text for footnote "4".

According to an embodiment, footnotes are inserted in several different ways. For example, the cursor may be placed at the end of a word and when the footnote editing interface is invoked, a reference number is placed at the end of the word and the cursor jumps to the footnote area allowing the user to type in the text of the footnote. In another embodiment, the cursor may be placed in the middle of the word. In this case, when the footnote editing interface is invoked, a reference number is placed at the end of the word and the cursor jumps to the footnote area as before. In a further example, several words may be highlighted and when the footnote editing interface is invoked, a reference number is placed at the end of the last word of the highlighted group of words. These possibilities are illustrated in FIG. 9 as follows.

Figure 9:
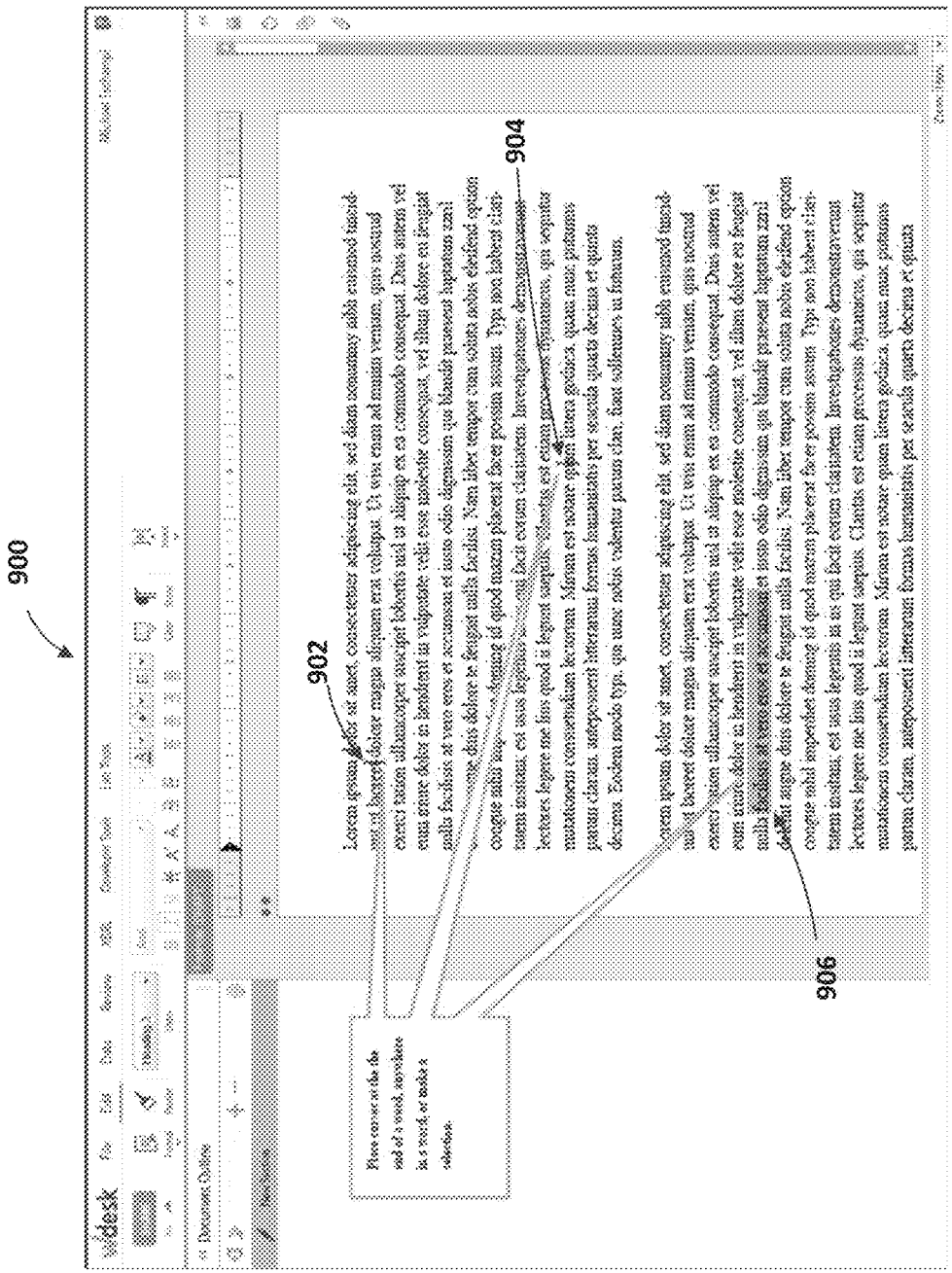
FIG. 9 is a screen shot showing various ways of inserting footnote reference numbers into a portion of text, according to an embodiment.

FIG. 9 is a schematic illustration 900 showing various ways of inserting footnote reference numbers into a portion of text, according to an embodiment. In a first example 902, the cursor may be placed at the end of a word. In a second example 904, the cursor may be placed in the middle of a word. In a third example 906, a group of words may be selected. In this example, the group of words may be selected using a standard input device 102 such as a mouse and/or keyboard. In each of these examples, footnotes are inserted by then invoking the footnote editing interface as illustrated in FIG. 10 below.

Figure 10:
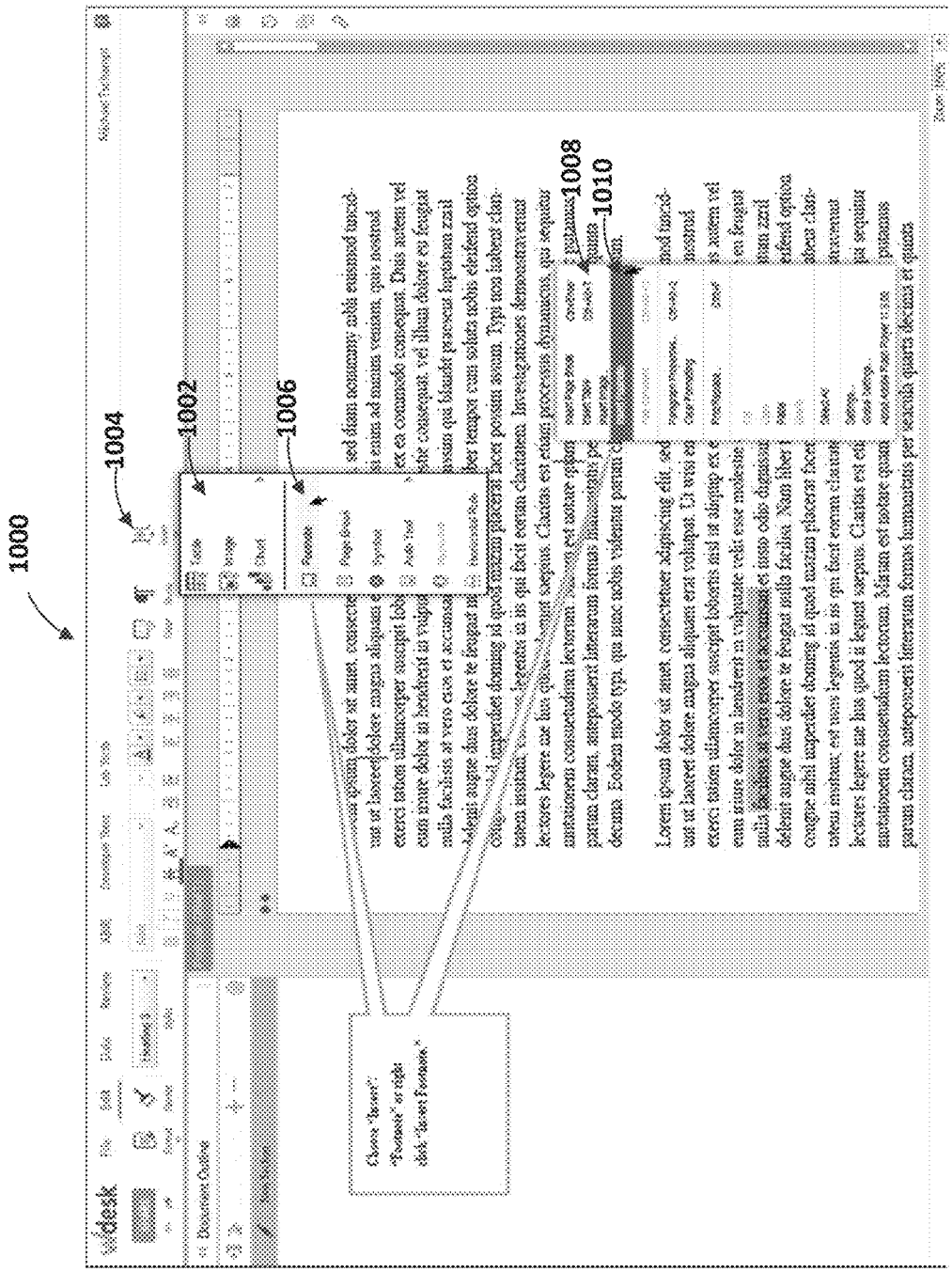
FIG. 10 is a schematic illustration showing ways of invoking the footnote editing interface, according to an embodiment.

FIG. 10 is a schematic illustration 1000 showing ways of invoking the footnote editing interface, according to an embodiment. For each of the three examples of FIG. 9, the footnote editing interface may be invoked in at least two ways. In a first example, a user may invoke a dropdown menu 1002 by selecting the "insert" tool 1004. From the dropdown menu 1002, the footnote editing interface may be invoked by selecting the footnote menu item 1006. In a further embodiment, the footnote editing interface may be invoked from a menu 1008 that may be opened by a keystroke or by manipulating the mouse. For example, menu 1008 may be opened by "right clicking" the mouse. From the menu 1008, the footnote editing interface may be invoked by selecting the footnote menu item 1010. For each of the three examples of FIG. 9, invoking the footnote editing interface results in the placement of a reference character in the text as shown in FIG. 11

Figure 11:
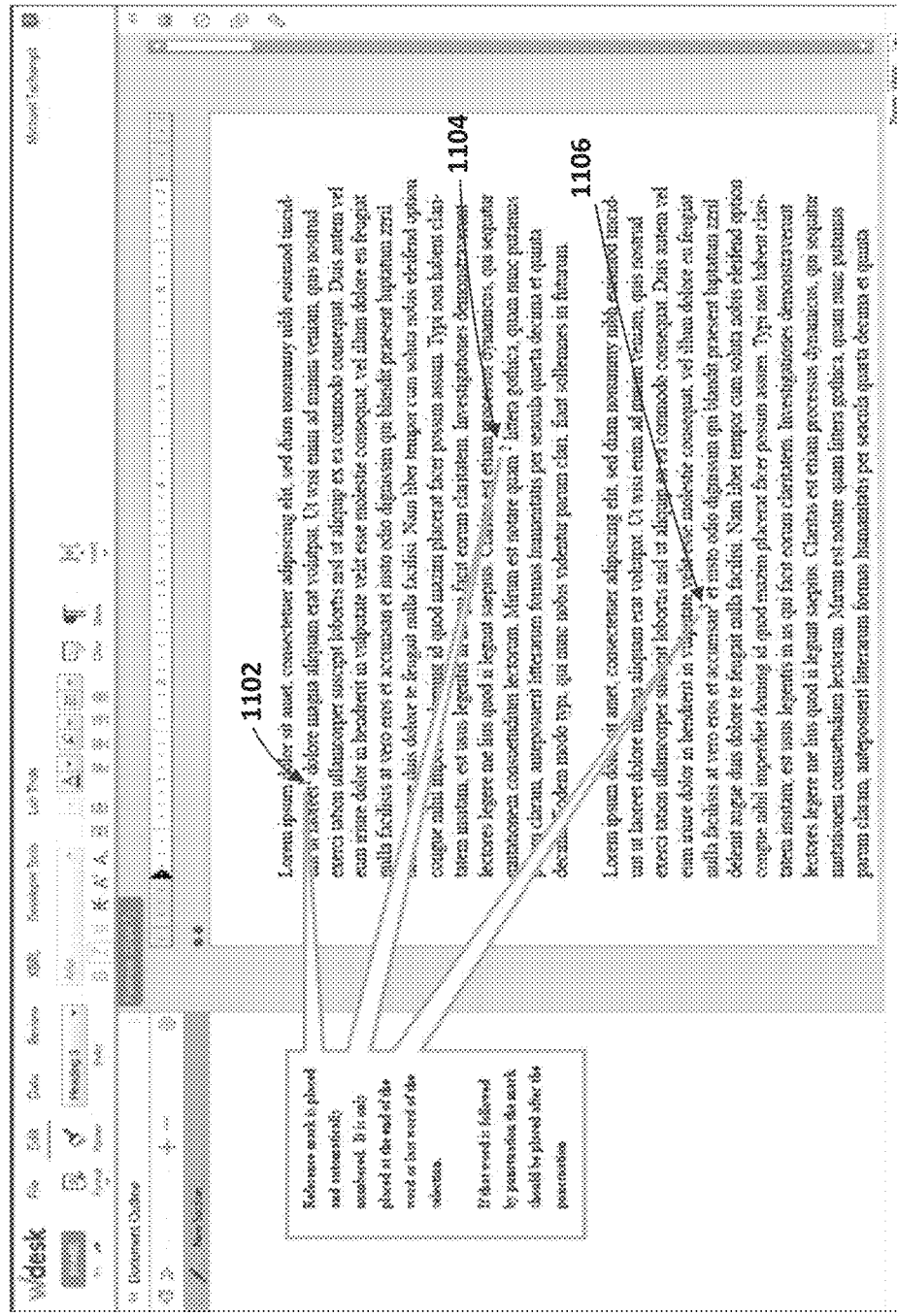
FIG. 11 is a screen shot showing placement of reference numbers in the text based on the examples of FIG. 9, according to an embodiment.

FIG. 11 is a schematic illustration 1100 showing placement of reference numbers in the text based on the examples of FIG. 9, according to an embodiment. In the first example 902 of FIG. 9, the cursor was placed at the end of a word. After invoking the footnote editing interface by either of the methods of FIG. 10, a footnote reference number 1102 appears at the end of the word where the cursor was placed in example 902.

In the second example 904 of FIG. 9, the cursor was placed in the middle of a word. After invoking the footnote editing interface by either of the methods of FIG. 10, a footnote reference number 1104 appears at the end of the word where the cursor was placed 904. If punctuation is added to the word 904 in which the cursor was placed, then the reference number 1104 is placed after the punctuation, as shown. In an embodiment, the rules for determining placement adjacent to punctuation (e.g., precede/follow, subscript/superscript) may be specified by the user via an input device 102, and optionally through a drop down interface similar to that of 410.

In the third example 906 of FIG. 9 a group of words was selected. After invoking the footnote editing interface by either of the methods of FIG. 10, a footnote reference number 1106 appears at the end of the last word in the selected group of words. In each of these examples, when the footnote editing interface is invoked and the footnote reference number is inserted in the text, the cursor then jumps to the footnote area allowing the user to type in the footnote text.

In each of the examples presented above, footnotes were referenced by reference "numbers." In other embodiments, footnotes need not be referenced by numbers, but rather, may be referenced by any suitable reference "characters" (e.g., letters, symbols, roman numerals, etc.).

Figure 12:
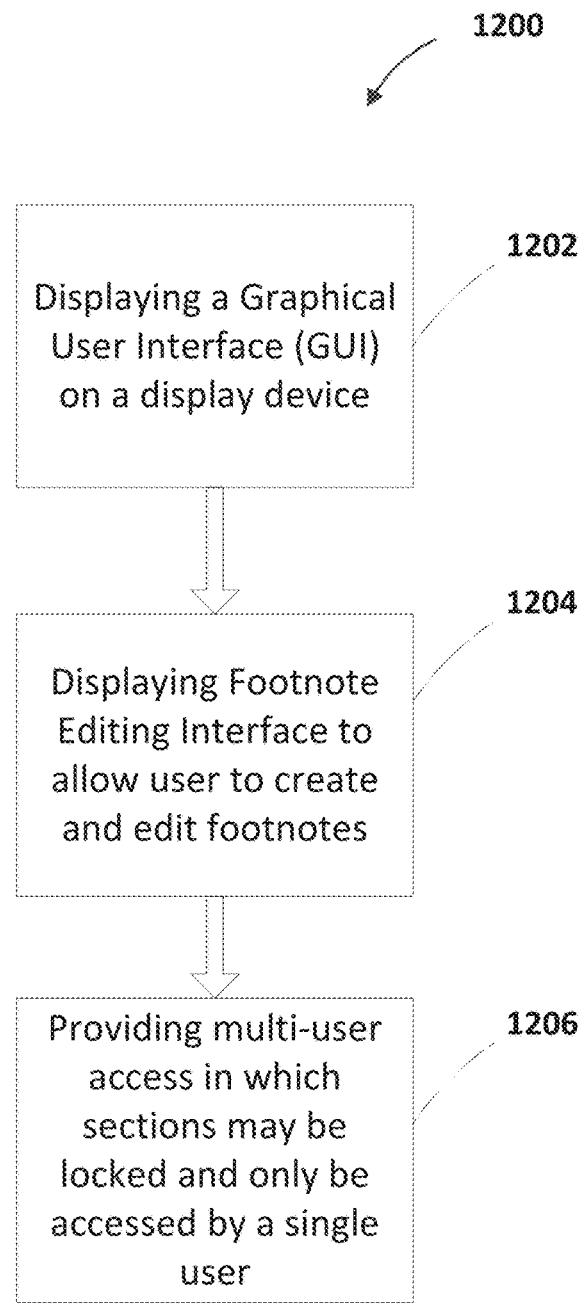
FIG. 12 is a flowchart illustrating a computer implemented method of intelligently formatting footnotes in multi-user documents.

FIG. 12 is a flowchart illustrating a computer implemented method 1200 of intelligently formatting footnotes in multi-user documents. In a first block 1202, the method 1200 includes displaying, by a computational device, a graphical user interface (GUI) on a display device, wherein the GUI allows a user to create new documents and to edit existing documents based on user interactions with the GUI.

In a second block 1204, the method 1200 includes displaying, in response to user input, a footnote editing interface within the GUI that allows a user to create new footnotes and edit existing footnotes based on user interactions with the footnote editing interface. As described above, the user interacts with the GUI by entering data using a standard input device 102. In this method, footnotes may reference multiple sections on one or more pages of a document and are formatted so that each footnote resides on only a single page.

In a third block 1206, the method 1200 includes providing multi-user access to a single document in which individual sections of the document may be active, inactive, and/or locked such that sections may be accessed only by respective authorized users and reflective of each section's state. This sort of multi-user access is described above with reference to FIG. 6. In further embodiments, the method 1200 may contain further blocks (not shown in FIG. 12). For example, the method may further include displaying an inactive section 602 (see FIG. 6) of the document as a blank area to users not active in that section and displaying a blank footnote area of the document (e.g., areas 604 and/or 606 of FIG. 6), corresponding to a footnote from an inactive section, to users not active in that section.

In a further embodiment, the method 1200 may include providing multiple references to a given footnote from a given section, from multiple sections, and from table entries. In a further embodiment, the method 1200 may include providing real-time updates of footnote formatting and numbering in response to input from a single user or from multiple users. In a further embodiment, the method 1200 may include providing formatting of footnotes in which punctuation is automatically added or deleted as footnotes are added or deleted, respectively.

For example, suppose a word includes references to three footnotes formatted with punctuation such as "1, 2, 3, . . . " and then a footnote, say footnote "2" is deleted. In this situation, according to an embodiment, the footnote reference list is automatically updated to read "1, 2, . . . " wherein footnote "3" has been renumbered as footnote "2" and the second comma "," has been removed. According to an embodiment, this automatic updating of the footnotes and footnote references occurs whether the footnotes occur in a body text region of a paragraph or in table entries.

In a further embodiment, the method 1200 may include merging, in response to user input, one or more documents having footnotes into a single document and renumbering all footnotes and references to footnotes in the resulting merged documents to have correct numbering, formatting, and punctuation. In a further embodiment, the method 1200 may include displaying document text in a text display area and footnotes in a footnote display area on document pages having multiple sections per page such that each footnote resides only on a single page.

In a further embodiment, the method 1200 may include determining and displaying the text display area and footnote display area in real time as text is entered into the text display area and/or text is entered into the footnote display area from one or more users. In a further embodiment, the method 1200 may include determining and displaying the text display area and footnote display area in real time based on pixel coordinates of each text line, whether the line is displayed or not.

In a further embodiment, a non-transitory computer readable storage device having computer program instructions stored thereon is provided. The computer program instructions are such that, when executed by a processor, they cause the processor to perform the method 1200 having blocks 1202, 1204, and 1206. In further embodiments, the non-transitory computer readable storage device further comprises computer program instructions stored thereon that, when executed by a processor, cause the processor to execute additional blocks of the method as described above.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the blocks of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism," "element," "unit," "structure," "means," and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical." It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc., may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A computer implemented system, comprising:
a display device;
a user interface that receives numerical and textual input;
a graphical user interface displayed on the display device that receives input from the user interface and provides visual feedback to a user;
a processor that is structurally configured or programmed to control the display device and the user interface to:
generate and display the graphical user interface on the display device, wherein the graphical user interface allows a user to create new documents and to edit existing documents based on user interactions with the graphical user interface;
display, in response to user input, a footnote editing interface that allows a user to create new footnotes and edit existing footnotes based on user interactions with the footnote editing interface, wherein footnotes may reference multiple sections on one or more pages of a document and are automatically formatted so that each footnote resides on only a single page;
display an inactive section and a footnote area of a document;
determine authorization rights of the user with respect to the inactive section; and
based on the determined authorization rights, display the inactive section and an area of the footnote area as a blank or obscured area,
wherein the area corresponds to a footnote from the inactive section, and
wherein the layout and pagination of the document and the footnote area on a user's machine is actively updated while multiple users are editing the document even when these are changes to sections that the user is not permitted to access.

2. The computer implemented system of claim 1, wherein the processor is further structurally configured or programmed to:
provide multiple references to a given footnote from a given section, from multiple sections, and from table entries; and
provide real-time updates of footnote formatting and numbering in response to input from a single user or from multiple users.

3. The computer implemented system of claim 1, wherein the processor is further structurally configured or programmed to:
provide formatting of footnote references in which punctuation is automatically added or deleted as footnotes are added or deleted, respectively.

4. The computer implemented system of claim 1, wherein the processor is further structurally configured or programmed to:
merge, in response to user input, one or more documents having footnotes into a single document and renumber all footnotes and references to footnotes in the resulting merged documents to have correct numbering, formatting, and punctuation.

5. The computer implemented system of claim 1, wherein the processor is further structurally configured or programmed to:
display document text in a text display area and footnotes in a footnote display area on document pages having multiple sections per page such that each footnote resides only on a single page.

6. A computer implemented method, comprising:
- displaying, by a computational device, a graphical user interface on a display device, wherein the graphical user interface allows a user to create new documents and to edit existing documents based on user interactions with the graphical user interface;
- displaying, in response to user input, a footnote editing interface within the graphical user interface that allows a user to create new footnotes and edit existing footnotes based on user interactions with the footnote editing interface, wherein footnotes may reference multiple sections on one or more pages of a document and are automatically formatted so that each footnote resides on only a single page;
- displaying an inactive section and a footnote area of a document;
- determining authorization rights of the user with respect to the inactive section; and
- based on the determined authorization rights, displaying the inactive section and an area of the footnote area as a blank or obscured area,
- wherein the area corresponds to a footnote from the inactive section, and
- wherein the layout and pagination of the document and the footnote area on a user's machine is actively updated while multiple users are editing the document even when these are changes to sections that the user is not permitted to access.

7. The computer implemented method of claim 6, further comprising:
- providing multiple references to a given footnote from a given section, from multiple sections, and from table entries; and
- providing real-time updates of footnote formatting and numbering in response to input from a single user or from multiple users.

8. The computer implemented method of claim 6, further comprising:
- providing formatting of footnotes in which punctuation is automatically added or deleted as footnotes are added or deleted, respectively.

9. The computer implemented method of claim 6, further comprising:
- merging, in response to user input, one or more documents having footnotes into a single document and renumbering all footnotes and references to footnotes in the resulting merged documents to have correct numbering, formatting, and punctuation.

10. The computer implemented method of claim 6, further comprising:
- displaying document text in a text display area and footnotes in a footnote display area on document pages having multiple sections per page such that each footnote resides only on a single page.

11. A non-transitory computer readable storage device having computer program instructions stored thereon, that when executed by a processor, cause the processor to perform a method comprising the following operations:
- displaying a graphical user interface on a display device, wherein the graphical user interface allows a user to create new documents and to edit existing documents based on user interactions with the graphical user interface;
- displaying, in response to user input, a footnote editing interface that allows a user to create new footnotes and edit existing footnotes based on user interactions with the footnote editing interface, wherein footnotes may reference multiple sections on one or more pages of a document and are automatically formatted so that each footnote resides on only a single page;
- displaying an inactive section and a footnote area of a document;
- determining authorization rights of the user with respect to the inactive section; and
- based on the determined authorization rights, displaying the inactive section and an area of the footnote area as a blank or obscured area,
- wherein the area corresponds to a footnote from the inactive section, and
- wherein the layout and pagination of the document and the footnote area on a user's machine is actively updated while multiple users are editing the document even when these are changes to sections that the user is not permitted to access.

12. The non-transitory computer readable storage device of claim 11, further comprising computer program instructions stored thereon, that when executed by the processor, cause the processor to perform the following operations:
- providing multiple references to a given footnote from a given section, from multiple sections, and from table entries; and
- providing real-time updates of footnote formatting and numbering in response to input from a single user or from multiple users.

13. The non-transitory computer readable storage device of claim 11, further comprising computer program instructions stored thereon, that when executed by the processor, cause the processor to perform the following operations:
- providing formatting of footnotes in which punctuation is automatically added or deleted as footnotes are added or deleted, respectively.

14. The non-transitory computer readable storage device of claim 11, further comprising computer program instructions stored thereon, that when executed by the processor, cause the processor to perform the following operations:
- merging, in response to user input, one or more documents having footnotes into a single document and renumbering all footnotes and references to footnotes in the resulting merged documents to have correct numbering, formatting, and punctuation.

15. The non-transitory computer readable storage device of claim 11, further comprising computer program instructions stored thereon, that when executed by the processor, cause the processor to perform the following operations:
- displaying document text in a text display area and footnotes in a footnote display area on document pages having multiple sections per page such that each footnote resides only on a single page.

16. The non-transitory computer readable storage device of claim 15, further comprising computer program instructions stored thereon, that when executed by the processor, cause the processor to perform the following operations:
- determining and displaying the text display area and footnote display area in real time as text is entered into the text display area and/or text is entered into the footnote display area from one or more users.

17. The non-transitory computer readable storage device of claim 15, further comprising computer program instructions stored thereon, that when executed by the processor, cause the processor to perform the following operations:
- determining and displaying the text display area and footnote display area in real time based on pixel coordinates of each text line, whether the line is displayed or not.

* * * * *